United States Patent [19]
Witonsky et al.

[11] Patent Number: 5,676,465
[45] Date of Patent: Oct. 14, 1997

[54] LIQUID CRYSTAL CLINICAL THERMOMETER

[75] Inventors: Robert J. Witonsky, Princeton; John W. Scarantino, Mercerville, both of N.J.

[73] Assignee: Medical Indicators, Inc., West Trenton, N.J.

[21] Appl. No.: 344,346

[22] Filed: Nov. 22, 1994

[51] Int. Cl.⁶ .................................................. G01K 11/12
[52] U.S. Cl. .................................................. 374/162; 116/207
[58] Field of Search ........................ 374/160, 161, 374/162, 208; 116/216, 217, 206, 207; 428/1

[56] References Cited

U.S. PATENT DOCUMENTS

| | | |
|---|---|---|
| 3,810,779 | 5/1974 | Pickett et al. . |
| 3,974,317 | 8/1976 | Sharpless . |
| 4,064,872 | 12/1977 | Caplan . |
| 4,150,572 | 4/1979 | Lindquist .................. 374/160 |
| 4,345,470 | 8/1982 | Hof et al. .................. 374/162 |
| 4,459,046 | 7/1984 | Spirg .......................... 374/162 |
| 4,469,452 | 9/1984 | Sharpless et al. ......... 374/161 |
| 5,102,233 | 4/1992 | Staerk et al. .............. 374/160 |
| 5,215,378 | 6/1993 | Manske ...................... 374/162 |

FOREIGN PATENT DOCUMENTS 25 47 638  4/1977  Germany ............................. 116/217

*Primary Examiner*—G. Bradley Bennett
*Attorney, Agent, or Firm*—Anthony Lagani, Jr.

[57] ABSTRACT

A method is disclosed for improving the signal retention of a liquid crystal sensing element comprising an embossed cavity containing the liquid crystal and a cover layer sealing the liquid crystal in the cavity by heat treating at about 95° to about 120° C. for a time sufficient to cause the embossed cavity to shrink to substantially its original form thereby forcing the liquid crystal to be forced up against the cover layer to form a domed structure. Essential to the success of the process is incorporation in the cavity of about 10 to about 50% by volume of air based on the volume of the cavity.

10 Claims, 7 Drawing Sheets

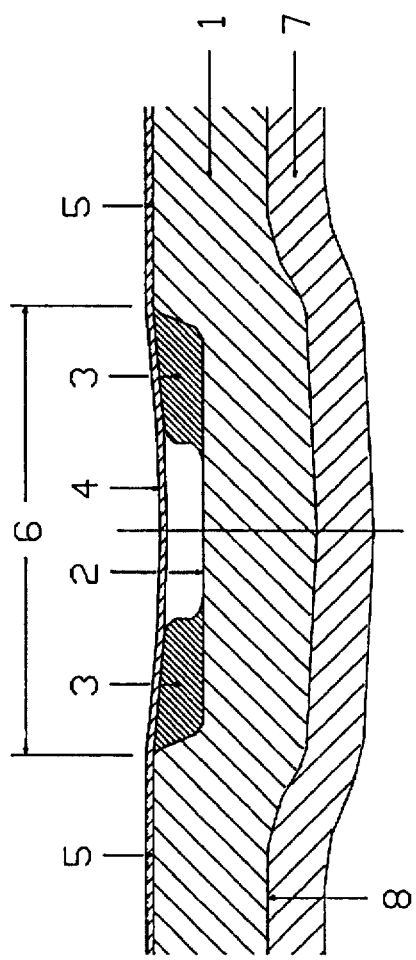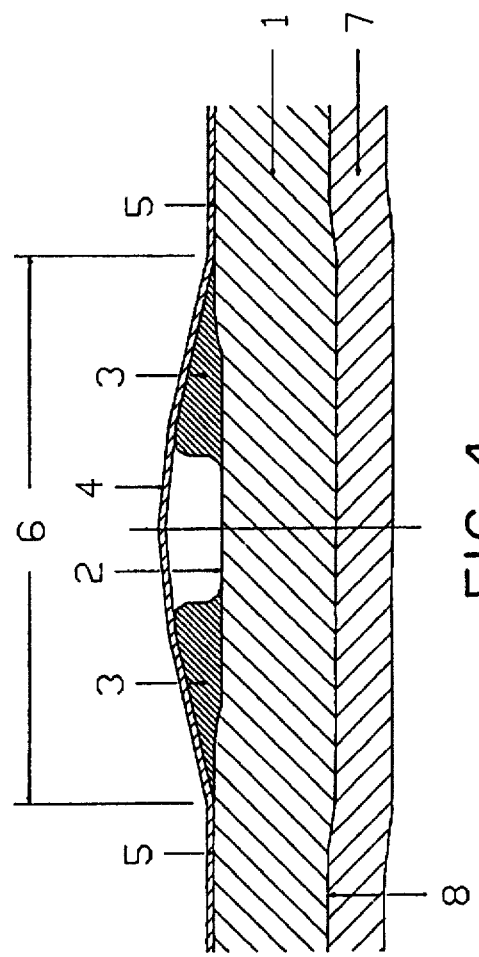

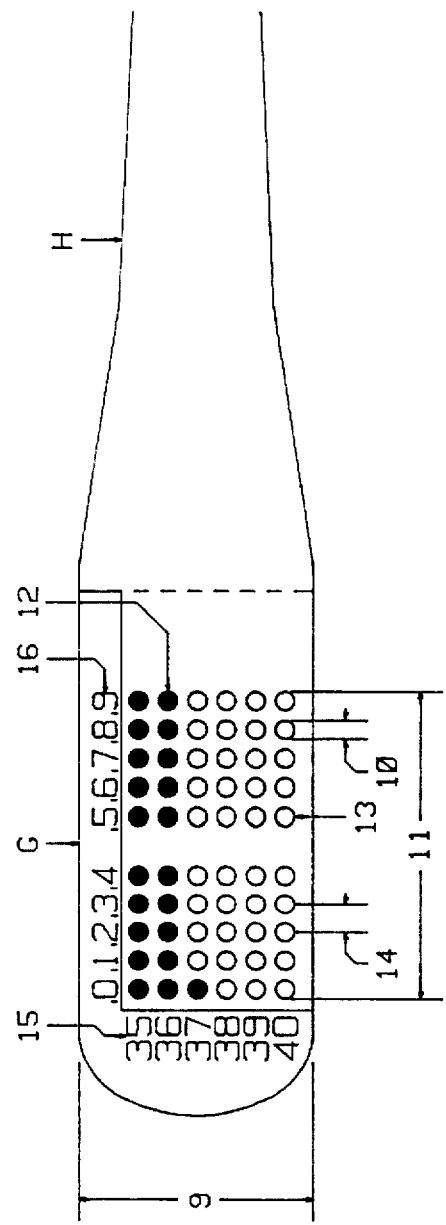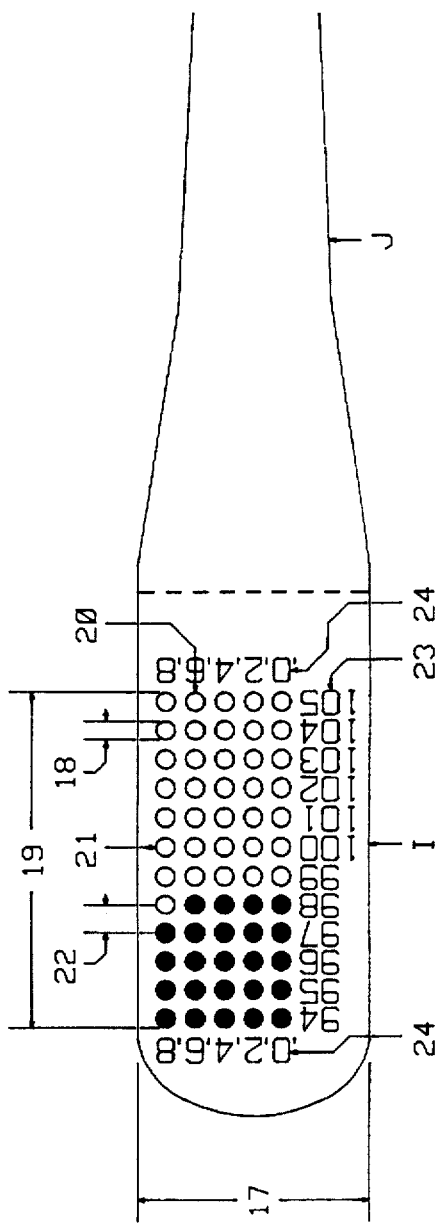

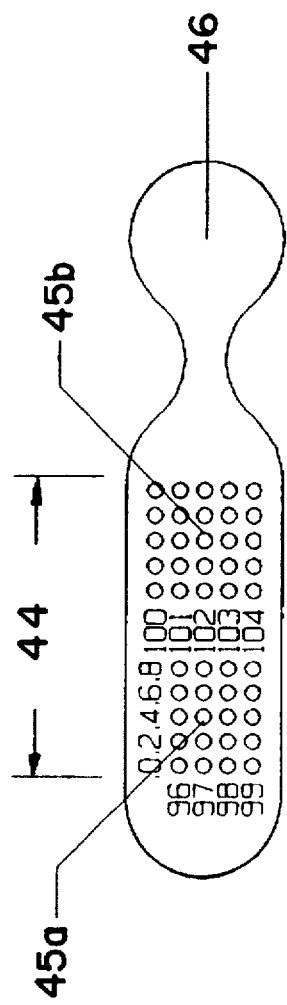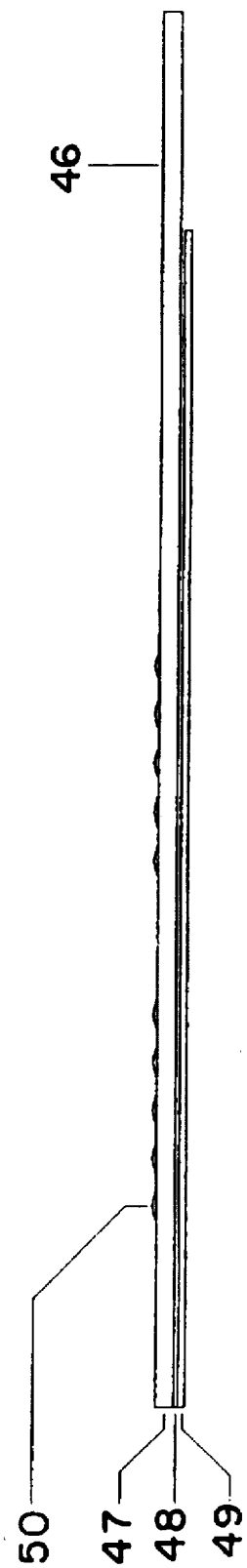
FIG.6A
FIG.6B

LIQUID CRYSTAL CLINICAL THERMOMETER

FIELD OF THE INVENTION

This invention relates to the field of clinical thermometers. In particular it relates to an improved liquid crystal clinical thermometer.

BACKGROUND OF THE INVENTION

The thermochromic property of cholesteric liquid crystal compounds has invited considerable effort for their application to thermometer inventions. Many of the liquid crystal thermometers described in prior art are alleged for the measurement of human body temperature; however, none has been a commercial success because they all fail in one or more of their attributes to satisfy the needs of the medical community.

The liquid crystal forehead thermometer is a good example of one such product. Because of its low resolution, +1° C. it has principally served as a screening device for fever, requiring subsequent confirmation of true body temperature with a mercury-in-glass or electronic clinical thermometer. This is not, however, its only serious drawback. The forehead has been found to be a unreliable site for representing core temperature, failing more than 50% of the time to detect fever (false negatives).

A medically acceptable clinical thermometer based on liquid crystal color changes must meet the same exacting standards for range (35°–41° C.), resolution (0.1° C.), accuracy (0.1° C. in the critical range, 0.2° C. elsewhere), and stability as do the mercury in glass and electronic clinical thermometers. Furthermore, it must be (i) designed to measure the temperature at a site which is accepted in the medical community as faithfully representing core temperature; e.g., rectum, sublingual cavity or axilla, (ii) easy to read, clean and reset between uses, (iii) safe and comfortable when used at the site, (iv) and retain its accuracy for at least five years during storage and distribution when subjected to temperature extremes of −20° to 60° C. It should also exhibit some special features which result in benefits not shared by competitive products; e.g., less expensive, easier to use, unbreakable, no power requirement, child friendly, etc.

U.S. Pat. No. 3,974,317, incorporated herein by reference, describes a thermometric composition which fulfills the requirements regarding range, resolution, accuracy and stability. This patent describes a cholesteric liquid crystal system which can be used to construct thermometric elements capable of recording numerous increments in temperature from a single basic composition in a facile and economic manner.

Each thermometric element of this invention comprises a plurality of separate compositions having identical colors when viewed on an inert black background. Each distinct composition is capable of recording temperature by a visual change in color and is comprised of a mixture containing:

a. a first cholesteric liquid crystal system characterized by exhibiting color in the cholesteric state at a first temperature and changing from this state to a second state exhibiting a different color at a second temperature, and b. a second component other than (a) which is a chemically inert substance miscible with (a); the same second component in differing percentages by weight thereof, being utilized in each composition wherein said liquid crystal systems are identical, the differing amounts of said second component in each composition wherein the liquid crystal systems are identical being in a predetermined weight range wherein there is a predictable variability in a curve in which the temperature at which said visual change in color takes place is plotted against percent by weight of said second component.

This '317 patent thus demonstrates that it is possible to change the phase transition temperature, referred to in the art as the clearing point, or focal conic state, of a liquid crystal system in a predictable manner by varying the amount of the second component (b) in the composition.

An illustrative example of a composition taught in the '317 patent is a liquid crystal system comprising 57.9% cholesteryl oleyl carbonate 30.7% cholesteryl chloride and 11.4% cholesteryl-n-butoxyphenyl carbonate as component (a). This composition has a clearing point at 54.0 C. When mineral oil, component (b), is added to (a), the clearing point temperature is depressed as a linear function of the percent by weight of the mineral oil added to (a). A plot of the clearing point temperature vs. weight percent mineral oil has a negative slope of 2.98° C. per one percent change in the mineral oil content of the composition, e.g., a composition containing 5.70 weight percent mineral oil would exhibit a clearing point at 37.0° C. whereas, a composition containing 5.67 % weight mineral oil would exhibit a clearing point 0.1° higher or 37.1° C.

Because the colors of all of the compositions containing both (a) and (b) are identical both below and above their respective clearing points, and because the change in color is not subjective, temperature differences as small as 0.1° C. can be easily resolved, thus making the compositions of U.S. Pat. No. 3,974,317 ideally suited for application in a clinical thermometer.

This chemistry, while necessary, is insufficient for making a clinical thermometer. What also must be specified are the heat sealable substrate and transparent covering film that contain the liquid crystal compositions and are inert relative to these compositions. Constraints on these materials are set forth in U.S. Pat. No. 4,064,872, incorporated herein by reference. Here it is taught that for the preparation of thermometers useful for medical diagnosis, the separate films comprising the heat sealable sheet material and the carrier substrate should contain less than 1 mg per square meter of components which will react with the liquid crystals, either during manufacture or storage. These potentially reactive materials may be residuals from the manufacturing process of the film such as monomers, solvents, inhibitors or processing aids which may react with or dissolve in the liquid crystal composition selected, resulting in modification of the temperature at which color change will take place. The '872 patent teaches the use of polyvinyl chloride (PVC) and polyvinylidene chloride (PVDC) coated laminates as the heat sealing material. This patent emphasizes that the materials selected to enclose the liquid crystal compositions should be of as low thermal mass as is possible consistent with sufficient durability to allow for repeated use.

The '872 patent additionally describes a method for constructing a clinical thermometer from these compositions by arranging them in a dot matrix array. Combining the teachings of this patent with those described in the '317 patent results in a clinical thermometer with the requisite precision, stability and accuracy set forth in the above discussion. Furthermore, this chemistry has been found to be nontoxic when tested on laboratory animals at doses where comparable levels of a common toothpaste led to fatalities in all the animals tested. Plastic thermometers made with this chemistry are unbreakable and can be used hundreds of times without loss of efficacy.

Thermometers made using the combined teachings of '317 and '872 patents suffer from a serious technical shortcoming relating to readability. Because of the small size of the individual dots, 1 mm diameter, the low contrast between the green liquid state and the gray focal conic state, and the relatively short duration of the signal, 15–20 seconds, before reversion begins, those unfamiliar with reading the thermometer or those attempting to read it in lighting of low intensity will experience difficulty. Because of this deficiency, clinical thermometers made using these teachings have experienced limited commercial success.

When most liquid crystal thermometers are removed from one environment in their range of transition to a lower temperature, the signal fades so rapidly that it is not possible to obtain an accurate temperature determination of the first environment. This is for two reasons. Firstly, like all thermometers, those made of liquid crystals are of low thermal mass and cool quickly. Secondly, nearly all liquid crystal compositions respond with time constants of less than one second, whether it is exposed to a temperature increase or decrease and thus display exceedingly short memory.

The chemistry taught in '317 does not differ from other liquid crystal thermometer chemistries in this respect for its transition from its clear isotropic state to a cloudy focal conic state is essentially instantaneous. For reasons which are not well understood, however, the particular combination of liquid crystals described in the '317 patent becomes trapped briefly in this focal conic state undergoing a rather sluggish transition from this state to the brightly colored liquid crystal state. This brief memory is quite sensitive to the temperature difference between the test and reading environments. For example, a liquid crystal thermometer removed from a 37° C. mouth and returned to a room temperature of about 20° C. would retain a high contrast signal for approximately 20 seconds before disappearing; whereas, the same thermometer withdrawn from a mouth at 40° C. and returned to room temperature would retain its signal for only 10 seconds.

BRIEF DESCRIPTION OF THE DRAWINGS

FIG. 1 shows an individual pocket of the prior art thermometer filled with liquid crystal chemical;

FIG. 2 shows a typical Centigrade Scale thermometer;

FIG. 3 shows a typical Fahrenheit Scale thermometer;

FIG. 4 shows the inverted pocket of this invention;

FIGS. 6A and 6B show a typical clinical thermometer for use on the abdomen;

SUMMARY OF INVENTION

Figure 5A:
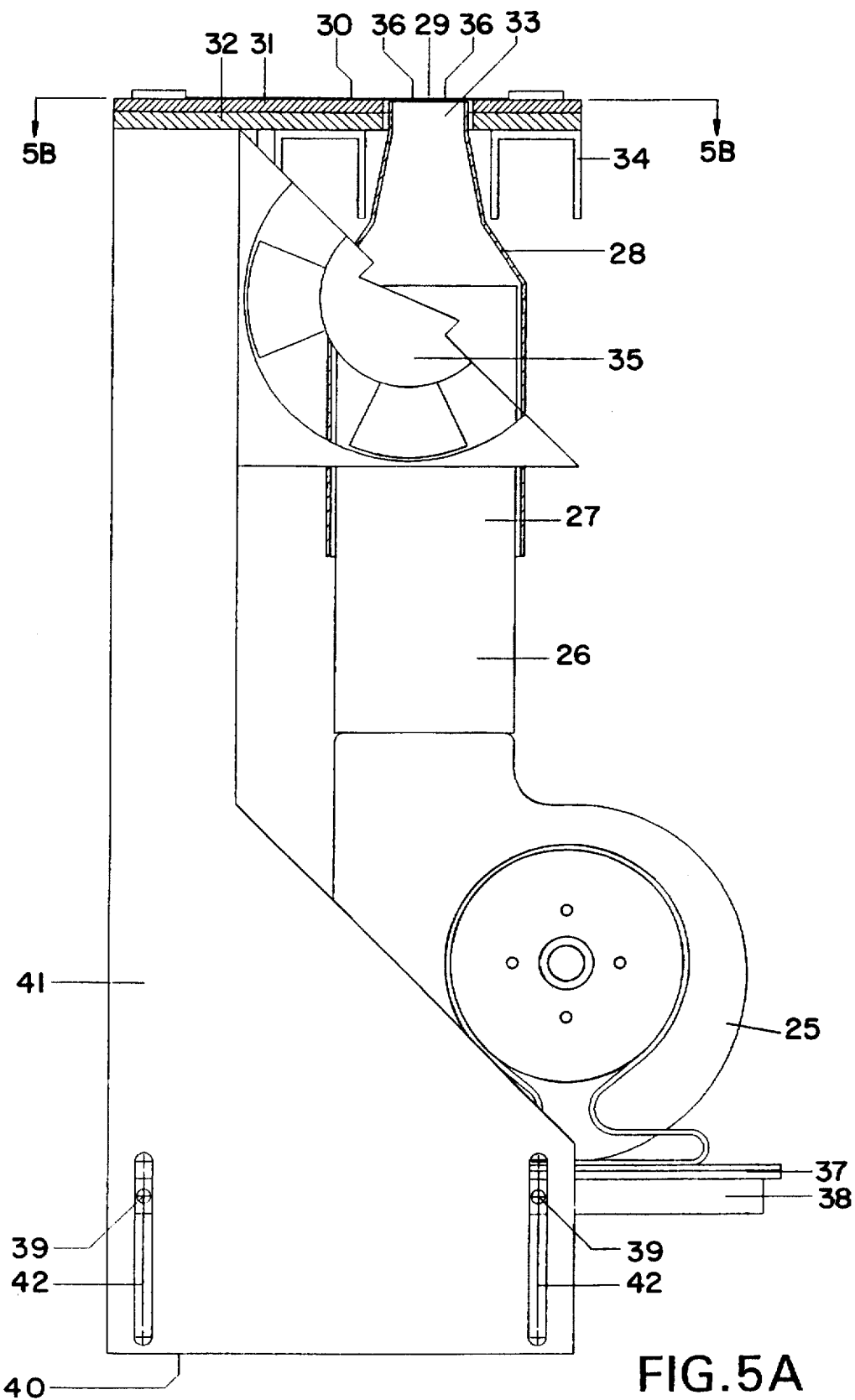
FIG. 5A shows a partial cut away elevation view of a heating unit for producing the cavity inversion of this invention.

It has surprisingly been found that by containing the liquid crystal composition in a pocket or cavity having a domed, inverted structure and an air void comprising about 5 to about 50% of the volume of the cavity, results in a thermometer which overcomes the deficiencies of the prior art liquid crystal devices in that the signal is retained indefinitely, while at the same time being fully reversible by the application of pressure to the liquid crystal containing region of the thermometer. Concomitantly, this modification also enhances the contrast between the two states, liquid crystal and focal conic, useful for temperature measurement.

The inversion of the thermometer pocket is accomplished by subjecting the thermometer of conventional structure to elevated temperatures.

DETAILED DESCRIPTION OF THE INVENTION

This invention relates to a structural modification in the prior art liquid crystal thermometers which overcomes the deficiencies of those thermometers. The structural change described herein results in a prolongation of the signal retention time often referred to as hysteresis or memory. Concomitantly, this modification also enhances the contrast between the two states, liquid crystal and focal conic, useful for temperature measurement.

The structural change taught here results in a higher contrast signal which persists for a time period three to four times longer than those achievable with the composition taught in the '317 patent. This is followed by a discernible, low contrast signal which persists indefinitely if it is not mechanically erased. The enhancement of the signal contrast is achieved also by this structural modification which allows for greater light gathering property of the liquid crystal. This combination of enhanced contrast and prolonged signal retention allow the user to make the reading with light of low intensity from either incandescent or fluorescent source and even recheck it subsequently if desired. A surprising advantage of the inverted structure of this invention is that the application of slight pressure to the pressure sensing element results in a reversion to the liquid crystal state of those sensing elements which are below the clearing point.

Because the low contrast signal persists indefinitely, a clinical thermometer incorporating the structural change described in this disclosure requires that pressure be applied to the convex domes containing the thermochromic elements, e.g., by stroking, between uses to clear the previous reading. This is analogous to the shake-down feature of the clinical mercury-in-glass clinical thermometer, but is more easily accomplished.

In order to fully appreciate the instant invention it is necessary to understand the structure of prior art clinical thermometers prepared utilizing the liquid crystal chemistry of the '317 patent. This structure is described in U.S. Pat. Nos. 4,064,872, and 4,345,470, both of which are incorporated herein by reference.

The thermometers described in the '872 and '470 patents consist of a carrier layer made from aluminum or a plastic laminate into which a plurality of small spherical or cylindrical pockets or cavities are mechanically embossed. For a clinical thermometer covering the normal body temperature and fever range in increments of 0.1 C., about 60 such cavities are required. Furthermore, they must be arranged in a grid-like pattern so that they all experience the same temperature at the site of measurement. Into each of these cavities of about 1 mm diameter and 0.1 mm depth is deposited a fixed liquid crystal composition containing the three compounds cholesteryl chloride, cholesteryl oleyl carbonate and cholesteryl n-butoxyphenyl carbonate and a varying weight per cent mineral oil as taught in '317. The sixty or so different compositions are deposited into the sixty or so cavities simultaneously using a microdeposition process capable of delivering quantities as small as 0.02 milligrams of the specific mixture with an accuracy of approximately 15%.

The chemicals are subsequently enclosed in these cavities by sealing a transparent covering film to the non-embossed land area of the carrier surface. These forming, filling and sealing steps result in the production of a roll of thermometers which can subsequently be die-cut into shapes suitable for their intended use.

Referring now to FIG. 1, a cross-section of a cavity containing the liquid crystal composition is shown. The carrier layer, 1, is embossed to form a depression or cavity, 2, into which is deposited the liquid crystal chemical composition, 3. The embossed cavity or depression, 2, is then sealed with a transparent cover layer, 4, which is heat sealed to the carrier layer, 1, on the unembossed land area, 5. All printing as shown in FIGS. 2 and 3 is done on the underside, 8, of the carrier layer, 1. Additionally, an overlayer of black pigment, not shown, is applied to the underside of the carrier layer, 1, in the thermometer field area (see FIGS. 2 & 3) to make the color of the liquid crystal chemical more visible. In order to protect the black pigment overlayer on the underside, 8, of the carrier layer, 1, from abrasion during the manufacturing process and subsequently during use, an additional layer, 7, of either clear or colored plastic film can be adhesively bound to the carrier layer, 1. Pressure sensitive adhesive coated white polypropylene, polyethylene or polyester are satisfactory choices for this additional layer, 7, application with factors such as cost and ease of die cutting determining the specific choice.

The base or carrier layer, 1, must also satisfy a constellation of properties to function in this type of thermometer. The plastic film or laminate comprising the carrier layer, 1, must be clear so that the back side can be printed black; it must be embossible without cracking to a depth of about 0.2 mm; it must be inert with respect to the liquid crystals and contain no residual low molecular substances from its processing that could migrate into and contaminate the liquid crystals; it must be heat sealable to other thin transparent inert plastic films.

A preferred material which satisfies these criteria is Kodar® PETG copolyester 6763 which is a clear amorphous polymer of polyethyleneglycol terphthalate ("PETG") with a glass transition temperature of 81° C. Kodar is a registered trademark of the Eastman Kodak Company.

The upper cover layer film 4, must also be inert with respect to the liquid crystals, transparent, heat sealable to the PETG and contain no low molecular weight components which can migrate into the liquid crystal composition through the heat sealing process or subsequently during storage. There are several materials that satisfy these criteria including laminates of PETG 6763, polyvinylidene chloride ("PVDC") coated polyesters such as DuPont's M44 film where the PVDC coating is applied from an aqueous emulsion and polyester films which are coated with amorphous polyester. Because phthalate polyesters do not readily heat seal to themselves, generally, the cover layer is coated with a polymer which permits heat sealing to these polyester. Preferably the heat sealable component, e.g., PVDC, is deposited from a water emulsion. Solvent deposition will ordinarily result in the retention of sufficient solvent to adversely effect the performance of the liquid crystal composition.

Referring now to FIG. 2 which illustrates a typical centigrade thermometer construction in the plan view, the thermometer has a sensing head section G, with a multiplicity of embossed cavities. Typically, the thermometer has a width, 9, of about 11 mm.

The diameter of the cavities, 10, is about 0.889 mm. The field, 11, can be about 11.5 mm long, and the rows, 12, and columns, 13, of cavities are spaced apart a center to center distance, 14, of about 1.4 mm. The centigrade scale, 15, ranging from 35 to 40 degrees Centigrade, runs along the left end of the sensing head, G. Each row of cavities represents a degree change in temperature. Along the top of the columns of cavities are numbers, 16, showing a 0.1 degree change from column to column. The text is about 0.114 mm in height for convenience of readability. Extending away from the head, G, is a handle portion, H, by which the thermometer can be held when inserting into the mouth or under the arm, for measurement. The design illustrated in FIG. 2 is in tended to be held in the right hand for reading. FIG. 2 illustrates a thermometer wherein the reading is 37.0° C.

Referring now to FIG. 3 which illustrates a typical thermometer construction in the plan view, of a Fahrenheit thermometer, the thermometer has a sensing head section I, with a multiplicity of embossed cavities. Typically, the thermometer has a width, 17, of about 11 mm.

The diameter of the cavities, 18, is about 0.889 mm. The field, 19, can be about 11.5 mm long, and the rows, 20, and columns, 21, of cavities are spaced apart a center to center distance, 22, of about 1.4 mm. The Fahrenheit scale, 23, ranging from 94 to 105 degrees Fahrenheit, runs along the bottom of the sensing head, H. Each row of cavities represents a degree change in temperature. Along the left and right end of the Field, 19, of the columns of cavities are numbers, 24, showing a 0.2 degree change from row to row. The text is about 0.114 mm in height for convenience of readability. Extending away from the head, I, is a handle portion, J, by which the thermometer can be held when inserting into the mouth or under the arm, or for reading purposes. The design illustrated in FIG. 3 is intended to be held in either hand for reading. FIG. 3 illustrates a thermometer wherein the reading is 98.6° F.

We have found that the liquid crystal compositions described in the '317 patent satisfy the criteria for accuracy and stability when subjected to temperatures up to 65° C. Above this temperature the chemistry is irreversibly altered resulting in a loss of accuracy; e.g., at 100° C. the chemicals are adversely effected in approximately twenty seconds of exposure, Although 100° C. represents an unrealistic temperature from the perspective of shipping and storage, it rules out steam sterilization as a process for sterilization before use and puts a limit on heat sealing or other thermal processing conditions.

Thermometers made with the above described materials are both accurate and stable. They are, however, difficult to read for reasons expressed above. We have discovered a rather surprising phenomenon. When thermometers made of this structure are briefly subjected to hot water temperatures in the range 95°–100° C. the PETG relaxes, collapsing the embossed cavity and gives rise to a structure like that shown in FIG. 4.

Referring now to FIG. 4, the cavity, 2, has virtually disappeared forcing the chemical liquid crystal, 3, upward. The result is that the cover layer, 4, assumes a convex shape. As used in the specification and claims the term inverted cavity means the convex shape described above.

The exposure time at elevated temperature must be carefully controlled to achieve the desired inversion effect. Prolonged exposure to temperatures in this range results in the failure of the seal between the PETG and PVDC surfaces and destruction of the thermometer. If the exposure time is too short, only partial inversion is achieved and with it no dramatic change.

When the combination of exposure time and temperature is set within certain limits, this thermal inversion process leads to two surprising changes. Firstly, the contrast between the green liquid crystal state and gray focal conic state of the liquid crystal is enhanced. Not wishing to be bound by theory, it is believed that this enhancement is probably a consequence of the greater light gathering property of the dome shaped structure of FIG. 4 in comparison to the cavity shape shown in FIG. 1. Secondly, the time before the signal begins to decay is extended from about 20 seconds to sixty seconds when the thermometer is removed from an environment at 36° C. and placed in an environment at 20° C. and from 10 to 30 seconds when the thermometer is removed from an environment at 40° C. into a cooler environment. Not only is there this three fold increase in memory, but also in the case of the inverted cavity structure it is possible to read the thermometer in a low contrast state for many minutes or even hours later. In fact, the liquid crystals never fully return to their brightly colored liquid crystal state unless they are mechanically stressed by gentle rubbing.

It is important to recognize that this process of thermal inversion is not equivalent to viewing the thermometer before it is inverted from the bottom side of the embossed cavities. A thermometer could be constructed to be used in this fashion if the black background printing is applied to the upper surface of the transparent cover layer; however, the mechanical forces on the liquid crystal would be different than those produced from the cavity collapsing and squeezing the liquid crystal between the two films.

Since the stability of the liquid crystal compositions is only 20 seconds at 100° C., the thermal inversion process must be completed quickly, i.e. less than 20 seconds. Generally, the inversion process is carried out in about 2 to about 15 seconds; typically, about 4 to 12 seconds, e.g., 10 seconds. The time in which the inversion process must be carried out is a function of the processing temperature. The higher the temperature the shorter the allowable time of exposure of the liquid crystal composition to the processing temperature.

The critical aspect of the inversion process is the temperature to which the sensing element is raised. Below 90° C. the inversion does not occur in a reasonable time frame, and for practical purposes is non-existent. Above 120° C. damage to the liquid crystal chemicals is so rapid that it is only with great difficulty that the process can be carried out safely. Hence the limits of time and temperature for carrying out the inversion process are a temperature range of about 95° C. to about 120° C. over a processing time of about 1 to about 20 seconds. It should be noted that the temperature referred to here is not the temperature of the heat source, but the temperature to which the sensing element is raised during processing. The air temperature can be about 150° C. to about 240° C. For example, using a hot air stream at 210° C. and exposure time of 4 seconds results in a successful inversion without damage to the liquid crystal chemical composition because the temperature of the liquid crystal is not raised above 120° C. for a time duration which causes damage to the chemicals. While reference to the liquid crystal is made with respect to the inversion process temperature, it will be appreciated by those skilled in the art having access to this disclosure that the temperature acts on the web to cause a mechanical change, e.g., shrinkage, thereby causing the inversion. It is the restoration of the cavity to substantially its original unembossed configuration that causes the effect achieved. Generally, the inversion is adequately accomplished for the purpose of this invention if the embossed cavity shrinks to about 85% of its originally volume. Optimally, the shrinkage results in a decease in volume of the embossed cavity by about 90 to 98%, e.g., 95%. reduction in embossed cavity volume. As used in the specification and claims the term "substantially the same as its original unembossed configuration" as used with respect to the embossed cavity and the inversion process means that the embossed cavity volume has been decreased by at least 90% of its original embossed volume. Ideally, the embossed cavity disappears entirely and all of the liquid crystal chemical is forced upward to the level of the surface of the substrate and above to form the domed configuration of the inverted cavity.

Four ways to accomplish the inversion process in the requisite time interval have been developed.

i. Raising the temperature at heat sealing from the normal sealing temperature of 130° C. to 180° C. and inverting at sealing. The contact time on the heated roller is about 0.06 seconds. Because of this short dwell time, the pressure of 160 bars at the nip rollers and the requirement that the heating must be applied from the PVDC/Polyester side, only partial inversion of the cavities occurs.

ii. Immersion of the individual thermometers or thermometer roll stock in hot water (90°–100° C.) for a few seconds. This process successfully inverts the cavities, but distorts the entire thermometer web from which thermometers are punched into a convex bow and requires that the water be blown off all surfaces of the thermometer before the roll stock is wound. Water also permeates into the thermometer affecting the accuracy. Although this absorption is reversible, it delays production and involves an additional drying process to restore accuracy.

iii. Bringing the thermometer web into intimate contact with a 2.5×30 cm Kapton® insulated etched foil heating element with a power of 60 watts (Omega Engineering) Kapton® is a trademark of Dupont for polyimides. This produces surface temperatures of about 120° C. under dynamic conditions. This also achieves the desired result, but again not without processing complications and material losses. This approach requires that the web be pressed from the upper surface to ensure good contact between the bottom surface and the hot platen. This force opposes the dome formation and must be adjusted with great care to insure complete inversion. Contact heating also has the disadvantage that it requires that there be either a mechanism for quickly making and breaking contact between the heating element and the web when either starting or stopping or a method to raise and lower the temperature above and below the glass transition point of the PETG, to prevent melting of the web.

iv. Heating the bottom of the web with hot air through an opening in an insulated platen just sufficiently wide to allow the hot air to contact the region containing the cavities. This method minimizes distortion of the web and, by controlling the air flow, results in rapid come-up and cool-down times as the process starts and stops. FIG. 5 illustrates the construction of a hot air assembly. With a web speed of 5.3 cm/sec, a thermometer pitch of 1.2 cm and a heated slot of 19 cm length, the thermal inversion processing time is about 4 seconds at a processing air temperature of about 210° C. The thermometer pitch is the distance between the thermometers on the continuous web of carrier layer.

There is a further constraint on the thermally inverted structure. The amount of liquid crystal that can be deposited in a cavity must be adjusted such that a small air pocket remains after the thermal inversion. The size of this air pocket must be at least 5% of the volume available for the liquid crystal, e.g., about 10%, and can be as large as 50% of this space; however, increasing the size of the air pocket reduces the size of the total of liquid crystal and diminishes the reflective area of the signal. In the absence of this air pocket the signal is of enhanced contrast but persists about only as long as in an uninverted cavity sensing element of the prior art. Not wishing to be bound by theory, it would appear that this air space is needed to relieve the internal pressure that builds in an incompressible fluid when the thermometers are cooled; i.e., there may be some slight contraction of the plastics on cooling which results in an increase in pressure. It has been found that an adequate signal strength is achieved by filling the cavity with liquid crystal chemical to about 50 to about 90% of its capacity. Optimal results are achieved when the cavity is filled with about 65 to 85% of liquid crystal the balance being air. Typically about 70 to 80%, e.g., 75% of the cavity is filled with liquid crystal composition. This results in approximately a 10% to 50% air filled void upon cooling, e.g. about 10 to about 30% where the liquid crystal comprises about 90 to about 70% of the cavity volume.

In addition to resulting in a prolonged signal, it has been found that the dome shaped structure of the inverted cavities allow for easy erasure of the signal. It is necessary only to apply pressure to the sensing elements to erase the signal, e.g., by wiping the raised, domed surfaces gently with a finger or cloth to clear the old signal.

The inverted structure of this invention results in a clinical thermometer which satisfies the criteria set forth above with respect to range, accuracy, resolution, stability, and ease of reading and clearing the signal .

Although the thermometer of this invention can be used repeatedly, in a hospital environment it may be of greater acceptability as a single use disposable. In this application the extended memory would require that a previous signal retained on the thermometer produced by elevated temperature during storage and distribution be cleared prior to use. This can be accomplished quite easily with a dispenser which rubs the domes lightly when a unit is withdrawn. Another way a residual signal can be cleared before use is by wrapping thermometer between two layers of cohesively coated film or paper. When the paper is peeled open and the thermometer withdrawn, the gentle contact is sufficient to clear the thermometer.

A preferred embodiment of this invention is as follows:

The preferred substrate is Kodar PETG copolyester of 0.20 mm thickness. This material is printed on one side with the black background that absorbs the components of light not reflected by the liquid crystals. An additional layer of white polypropylene of 0.10 thickness is adhesively bonded to the printed side of the PETG. This polypropylene layer serves three roles. It protects the printed surface from abrasion during the web transport process, it stabilizes the PETG against distortion when the pockets are thermally inverted, and it increases the opacity of the liquid crystal background. The printed laminate is first embossed with 60 cylindrical shaped cavities of 1.0 mm diameter and 0.10 mm depth. Next, approximately 30 micrograms of 60 different compositions of liquid crystal following the teaching of '317 are deposited into each of these cavities. Following the fill step a covering film of DuPont's M44, PVDC coated polyester, 0.013 mm in thickness is heat sealed to the PETG across the land area between the embossed regions encapsulating the liquid crystal sensors. These filled and sealed cavities are then inverted by directing a stream of hot air against the web's polypropylene surface through a 2.5×19 cm opening in an insulated platen. The air temperature at the web surface peaks at 210° C. and the web temperature is about 95° to about 120° C. The thermometer web is then cooled by blowing room temperature air over the web, and wound into a roll of about 300 meter length. Individual thermometers with shapes like those shown in FIGS. 2 and 3 are subsequently cut from the roll using a steel die set.

The fill step is carried out with any suitable microdeposition equipment. U.S. Pat. No. 3,810,779, discloses a typical fill system. This fill system operates on gravity feed. In view of the high viscosity of the liquid crystal chemicals, a modification of the '779 system which applies a pressure to the chemical storage reservoirs is preferred. a pressure of 1 to 3 PSI (about 50 to 150 tor) is adequate. The more accurately pressure is controlled, the less effected is the deposition process by level of the chemical in the storage reservoir. In one embodiment the reservoirs comprise hypodermic syringes from which the plungers have been removed, and to which an air source at controlled pressure is applied. It will be appreciated by those skilled in the art that a pressure regulator of good quality, e.g., sensitivity of +5 tor, and a drift of less than 5 tor, must be utilized to maintain the pressure applied to the syringe bodies within a predetermined pressure range. Where the chemical is a liquid crystal chemical composition, heating is neither required or preferred, since prolonged exposure to elevated temperatures will degrade the chemicals.

Referring now to FIG. 5A, a typical equipment arrangement for carrying out the inversion process is shown. A centrifugal fan, 25, supplies air at a velocity of about 47 CFM to a heating zone, 26, comprising heating elements of about 1500 to about 2000 watts of output. The heated air, not shown, at a temperature of about 210° C. passes through a duct, 27, into a heat shield, 28, which directs the air into the inversion zone, 29, against the product web, 30. It should be noted that it is not the air temperature which is critical, but the temperature to which the web is raised to cause the inversion. The heaters, not shown, extend the length of the duct, 27, into the heat shield, 28. As shown in the drawing the product web, 30, is moving in a direction into the paper; that is, the view shown is a cross section of the web across the machine direction of the web. The web, 30 is supported by a teflon insulator, 31, which is supported on an aluminum platen, 32. Both the insulator, 31, and the platen, 32, have a slot, 33, there through in the inversion zone, 29, thereby giving the heated air access to the web 30. Since it is essential not to overheat the web, 30, the platen, 32, is cooled by cooling fins, 34. Additionally, a cooling fan, 35, shown partially cut away to expose the heat shield, blows ambient air over the lower surface of the platen, 32, to insure that the web, 30, and in particular the liquid crystal chemicals, 36, of the thermometers are cooled rapidly and are not heated above about 95° to about 110° C.

The platen, 32, and centrifugal fan, 25 are supported on support structure, 41, The centrifugal fan, 25, together with the duct, 27, and heat shield, 28, rest on a support plate, 37, which is rigidly mounted on a movable plate, 38. The movable plate, 38, which is secured by bolts, 39, to the base, 40, of the support structure, 41, can move in a vertical direction in guide slots, 42, when the bolts, 39, are loosened.

This permits the entire fan and heat shield assembly to be moved away from the web, 30, for servicing. Additionally, it permits location of the heat shield, 28, to be adjusted in close proximity to the web, 30.

Figure 5B:
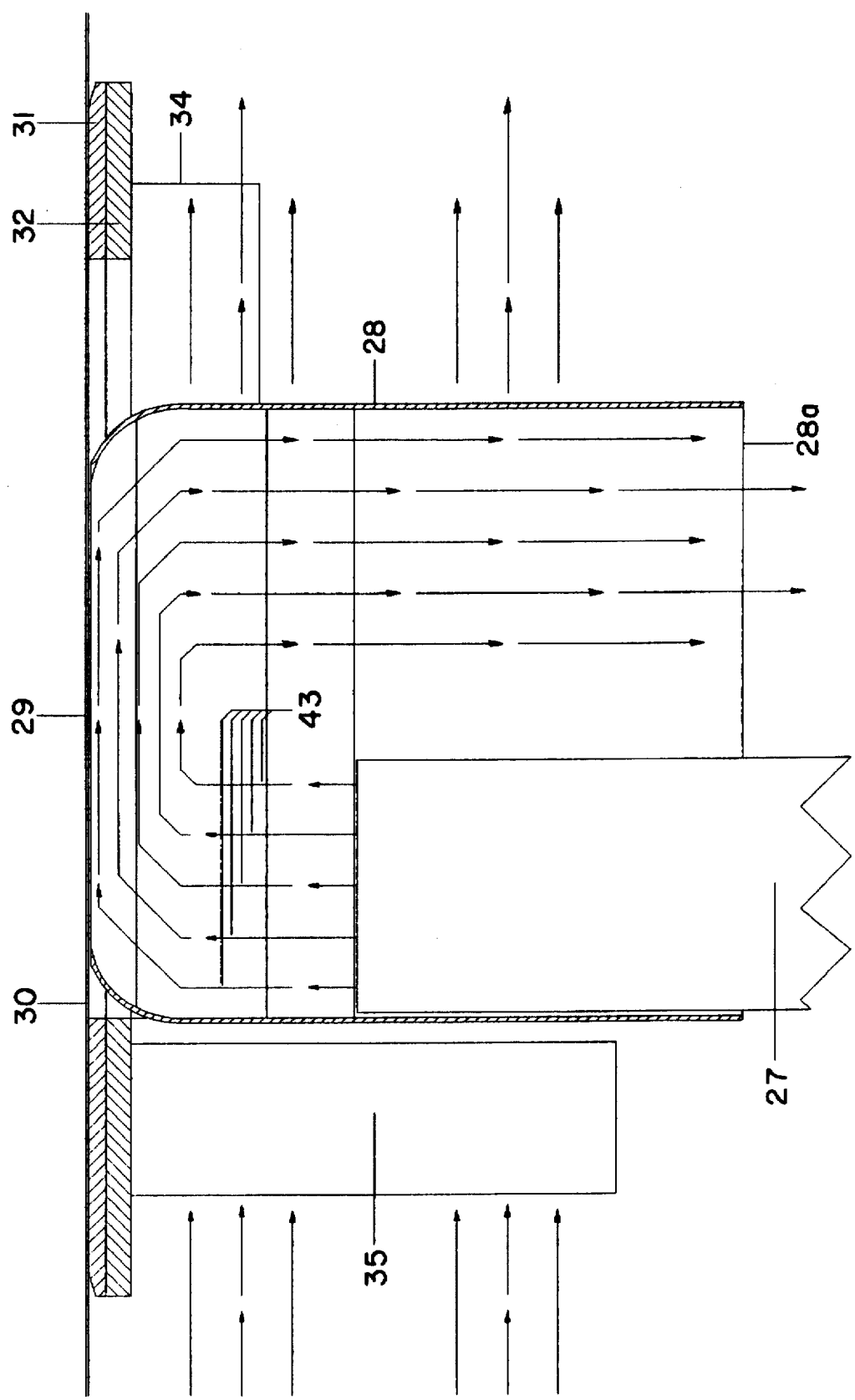
FIG. 5B is a cross sectional view along section line A—A as shown in FIG. 5A.

FIG. 5B is a cross section of the equipment arrangement along section A—A as shown in FIG. 5A, showing the upper portion of the duct, 27. The web, 30, moves in a machine direction from left to right, and is supported on the insulator, 31, and platen, 32. Flow lines, 43, show, schematically, the heated air flow out of the duct, 27, into the heat shield, 28, across the inversion zone, 29, and downward exiting through the lower end, 28a, of the heat shield, 28.

The cooling fan, 35, blows ambient air along the bottom of platen, 32, and along the cooling fins, 34, to cool the platen and web, 30, downstream of the heat shield, 28.

The thermometer of this invention with its inverted cavity meets the 20 second signal retention requirement of ASTM E1299-89 for a reusable thermometer as well as the one minute signal retention requirement of ASTM E825-92 for a single use thermometer.

When used as a clinical thermometer to measure temperatures orally or axillarily, the liquid crystal compositions of the '317 patent are subjected to temperatures of about 35° to about 41° C. When removed from the site of the heat source (under the tongue or arm) the thermometer is brought into an ambient temperature of about 20° C. This thermal shock is enhanced by evaporative cooling increasing the temperature difference by as much as 5° C. Under those circumstances there is a rapid reversion from the focal conic state to the liquid crystal state which takes place in about 20 seconds. Utilizing the inverted cavity or pocket of this invention, that reversion time is extended to as much as several hours under the same conditions. When, however, the temperature to which the sensing element is exposed varies about 4° C. or less, the signal retention time is in the order of several days.

This phenomenon can be utilized to continuously monitor body temperature. Taking 37° as the "normal" body temperature, there is rarely a 4° C. swing in body temperature even where fever is involved. Hence, when the thermometer of this invention is applied to an appropriate body site for measuring temperature, it will always read the last maximum body temperature since no reversion will occur between readings. On the other hand after reading the maximum temperature, the application of pressure, e.g., by rubbing the domed surfaces of the inverted cavities, results in reversion to the liquid crystal state of those sensing elements of the thermometer whose liquid crystal compositions are trapped in the focal conic state and whose transition temperature is above the body temperature at the measurement site, and immediately thereafter a change to the focal conic state for the temperature at the body site, thereby displaying the present body temperature. A typical construction of a thermometer which can be used to continuously read body temperature is shown in FIGS. 6A and 6B.

FIG. 6A depicts the plan view of a typical thermometer for continuous body temperature monitoring. The thermometer field, 44, is laid out in two sets of columns. The first set, 45a, covers the temperature range of 96.0° F. to 99.8° F. The second set, 45b, covers the temperature range from 100° to 104.8° F. While this arrangement differs from that of the thermometer of FIG. 3, the difference is one of choice, and not relevant to the function of the thermometer. Unlike an oral thermometer where placement is critical, and therefore, the arrangement of the sensing elements may affect accuracy, here no such criticality exists. The thermometer has a pull tab, 46, the function of which is readily apparent from FIG. 6B. Referring now to FIG. 6B, the thermometer, 7, has an adhesive layer, 48, which extends the length of the thermometer up to the pull tab, 46 which is free of adhesive. The adhesive layer is covered with a release paper, 49. The thermometer is applied to the body by striping the release paper off of the thermometer and pressing the adhesive side to the body. The sensing elements, 50, of the thermometer are the inverted cavities of this invention. When the thermometer, 47, is adhered to the body, the pull tab, 48, is unattached. It can be used to release the thermometer from the body when it is to be discarded.

The thermometer can be used in the axillary position. However, it is most advantageously used on new born infants by applying to the abdomen in the area over the liver. This body site is alleged to approximate core temperature. A nurse attending the infant can read the maximum temperature of the infant since the last visit by the nurse. The nurse can then apply pressure to the thermometer, thereby erasing so much of the signal which is represented by sensing elements whose transition temperature is above the body temperature at the thermometer location. After about 5 seconds the current temperature of the infant can be read.

While the concept of inverting the cavity containing the liquid crystal composition when applied to the thermometer of this invention requires the entrapment of air to cause the prolonged signal retention, it can be applied to prior art liquid crystal thermometers to enhance readability. In the prior art thermometers it is desirable to eliminate the toroidal configuration of the liquid crystal composition formed when the liquid crystal composition is deposited in the cavity. A coin shaped configuration of the liquid crystal composition which appears to fill the cavity is preferred from the standpoint of readability. This is accomplished by displacing air in the cavity with helium prior to heat sealing the transparent cover to the embossed substrate. The structure of this filled cavity is essentially as shown in FIG. 1. After heat sealing the helium escapes from the enclosed cavity at a rate which exceeds the ability of air to reenter the pocket by diffusion. As a consequence a reduced pressure is formed in the cavity, resulting in the cover film being pressed down against the liquid crystal chemical by the difference in pressure across the cover film. The result is that the toroid disappears, and the chemical appears to fill the cavity completely in a coin shaped configuration. The readability of this prior art thermometer is, however, dependent on the angle of light striking the thermometer, and users must be trained to read the thermometer by adjusting its orientation to available light.

in general the procedure for preparing a thermometer are as follows: A prepared web comprising PETG having the thermometer scale printed on the underside, and overlayed with a protective polypropylene film is fed into an embossing station of a thermometer production line. After embossing the web moves to a fill station where liquid crystal composition is deposited into the embossed cavities. Thereafter, the web is fed into a heat sealing roller nip where it is merged with a cover layer which is heat sealed to the web. The thermometer web leaves the nip with the cover layer adhered to the web in the area of the field, thereby sealing the liquid crystal composition in the cavities. The sealed thermometer structure is then cooled and subsequently die cut to the desired shape. For a line speed of about 250 cm/sec, the heated roller surface temperature is about 134° C. to effectuate an adequate seal.

If the cavity inversion process is applied to the prior art, helium treated thermometer the result is that the thermometer is less dependent on the angle of light striking the thermometer than in the case of thermometers with uninverted cavities. Additionally, the dome configuration causes the cavity to appear larger and the thermometer is more easily read by an untrained user.

Although helium is lighter than air it has surprisingly been found that helium can be introduced into a thermometer cavity by directing a stream of helium into the nip of rollers utilized to heat seal the cover layer to the substrate. The conventional method of sealing the cover layer to the substrate is to pass the embossed substrate with its chemical filled cavities and the cover layer into the nip of a pair of rollers one of which is heated.

Figure 7:
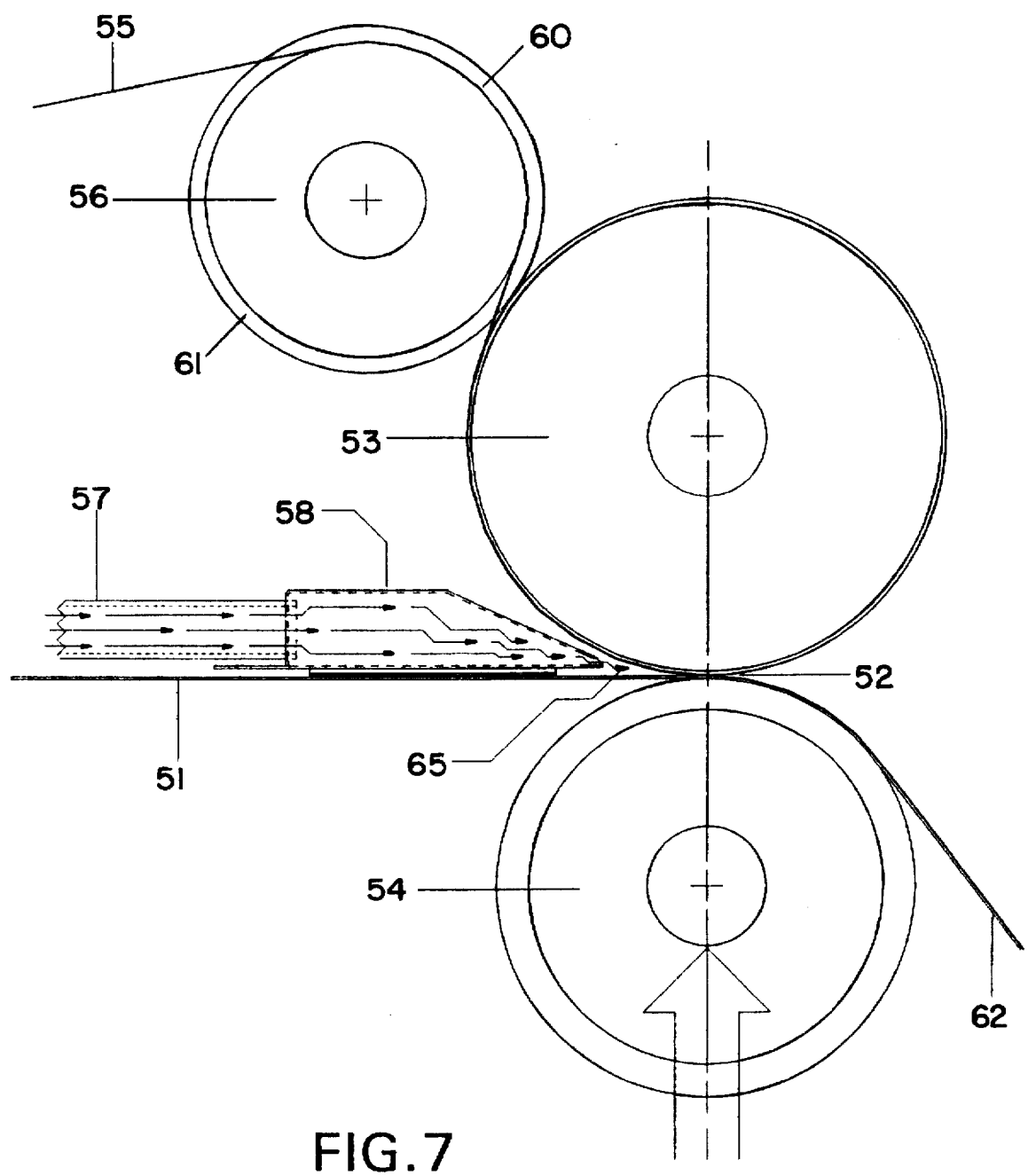
FIG. 7 shows an elevation view of sealing equipment.

Referring now to FIG. 7 an embossed web, 51, containing cavities, not shown, to which liquid crystal compositions, not shown, have been added is passed through the nip, 52, formed by heated roller, 53, and a pressure roller, 54. The thermometers are aligned on the web so that their longer dimension is parallel to the axis of rotation of the rollers. The cover layer, 55, which 1s a laminate of polyester and PVDC passes over a guide roller, 56, around a section of the heated roller, 51, and into the nip, 52, where the web, 51, comprising PETG 1s sealed to the cover layer, 55, by melting of the PVDC layer of the cover layer, 55. The cover layer, 55, enters the nip, 52, with the PVDC side of the cover layer laminate, 55, in juxtaposition with the PETG layer of the web, 51. Since the heat sealing temperature is about 134° C., the polyester layer of the cover layer laminate is not melted by the heated roller, 53. The sealed web, 61, then passes through cooling rollers, not shown, which cool the thermometers prior to winding into a roll for transfer to a die punching station, not shown, for punching out the individual thermometers from the web. The cooling rollers are driven, and pull the web, 51, and cover layer, 55, through the nip, 52. the pressure applied by the pressure roller should not be so great as to crush the cavity. Generally an air pressure of about 40 pounds applied to pistons used to urge the pressure roller against the heater roller is adequate.

Where helium is to be introduced into the cavities a stream of helium, 65, from a helium line source, 57, is fed into a nozzle, 58, which directs the helium stream, 65, directly into the nip, 52, of the rollers. In the process of doing so the helium flushes the air out of the cavity, not shown, and fills the cavity. Diffusion, of the helium out of the cavity takes place over about twenty to thirty minutes. The inversion of the cavities is carried out in the manner described above before die punching the individual thermometers.

Figure 8:
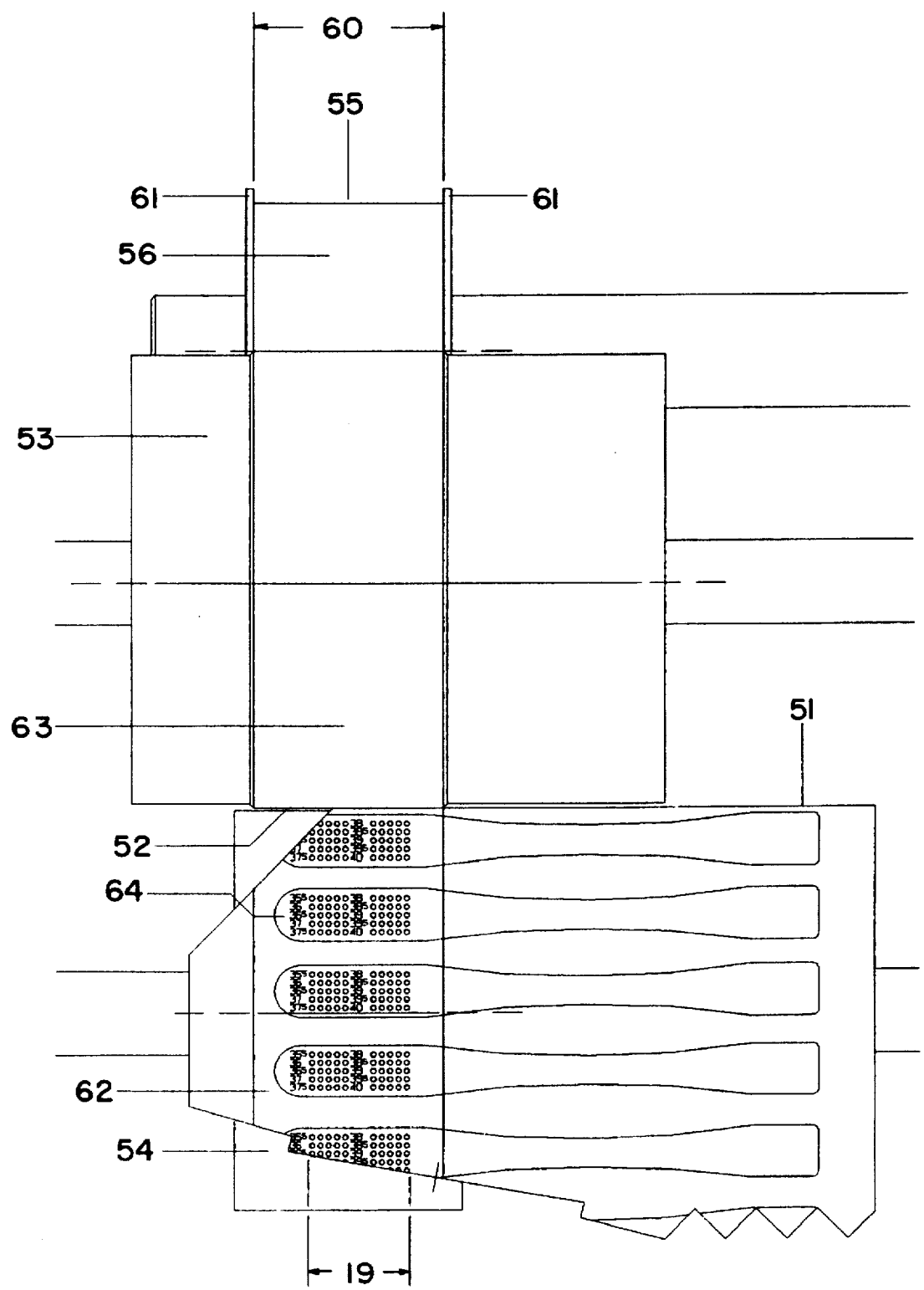
FIG. 8 is an elevation end view of the equipment shown in FIG. 7.

As shown in FIG. 8, which is an end view of the thermometer sealing line shown in FIG. 7, the pressure roller, 54, is slightly wider than the sealing section, 63, of the heater roller, 53. The sealing section, 63, of heated roller, 53, is raised so as to seal the cover layer 55, only to the area about the field, 19, of the thermometer, 64. The sealing section, 63, of the heated roller, 53, is the width of the cover layer which is to be sealed to the web, 51, at the field, 19, only. The heated roller, 53, is a chrome plated polished roller while the pressure roller, 54, is encased with silicone rubber. The guide roller, 56, has a recessed section, 60, in which the cover layer, 55, rides, and an outer larger diameter, 61, which guides the edge of film. The thermometer outlines shown in FIG. 8 are for illustration purposes only. They do not exist in practice. The shape of the thermometer will depend on the design of the die used to punch out the thermometers from the web. Prior to die punching only the thermometer field is visible on the web.

What is claimed is:

1. A temperature sensing element comprising a void volume, said void volume being defined by a substrate and a cover layer, the void volume containing therein a composition comprising at least one cholesteric liquid crystal chemical temperature sensing composition which occupies about 50 to about 90% of the volume of the void volume, the composition being configured in a toroidal shaped ring along a circumferential region defined by the intersection of the substrate and cover layer, the cover layer having a convex configuration; the liquid crystal chemical temperature sensing composition being in contact with the convex cover layer and having a convex shape, that portion of the void volume not containing the liquid crystal composition containing air.

2. The sensing element according to claim 1 wherein the cholesteric liquid crystal composition comprises about 57.9 weight %, based on the liquid crystal composition, of cholesteryl oleyl carbonate; 30.7 wt. %, based on the liquid crystal composition, of cholesteryl chloride, and 11.4 wt. % cholesteryl-n-butoxyphenyl carbonate, based on the liquid crystal composition, diluted with a mineral oil.

3. A thermometer comprising a multiplicity of sensing elements according to claim 1.

4. The thermometer according to claim 3 wherein the cholesteric liquid crystal composition of the sensing elements comprises about 57.9 weight %, based on the liquid crystal composition, of cholesteryl oleyl carbonate, 30.7 wt. %, based on the liquid crystal composition, cholesteryl chloride and 11.4 wt. % cholesteryl-n-butoxyphenyl carbonate, based on the liquid crystal composition, diluted with a mineral oil, each of said cavities containing a different amount of mineral oil than each of the other cavities, thereby defining a temperature range over which the thermometer is operative.

5. The sensing element according to claim 1 wherein the substrate comprises PETG and the cover layer comprises polyester coated PVDC.

6. The thermometer according to claim 3 wherein the substrate comprises PETG and the cover layer comprises polyester coated PVDC.

7. The thermometer according to claim 4 wherein the substrate comprises PETG and the cover layer comprises polyester coated PVDC.

8. A method for continuously measuring a body temperature of a patient which comprises adhesively applying the thermometer according to claim 4 to a body area of the patient which has a temperature with a fixed relationship to a core temperature of the patient; reading the thermometer to ascertain a maximum temperature attained by the patient since a prior reading of the thermometer; applying pressure to the thermometer to cause sensing elements of the thermometer which have a transition temperature which is below the temperature of the body area to revert to a liquid crystal state, waiting for a time sufficient for the thermometer liquid crystal composition to change to a focal conic state consistent with the temperature of the patient, and reading the patients temperature.

9. The sensing element according to claim 1 wherein the liquid crystal composition comprises about 65 to about 85% of the void volume.

10. The sensing element according to claim 1 wherein the liquid crystal composition comprises about 70 to about 80% of the void volume.

* * * * *